No. 854,221. PATENTED MAY 21, 1907.
M. KLAIBER.
PHOTOGRAPHIC SHUTTER.
APPLICATION FILED JAN. 11, 1906.
2 SHEETS—SHEET 2.
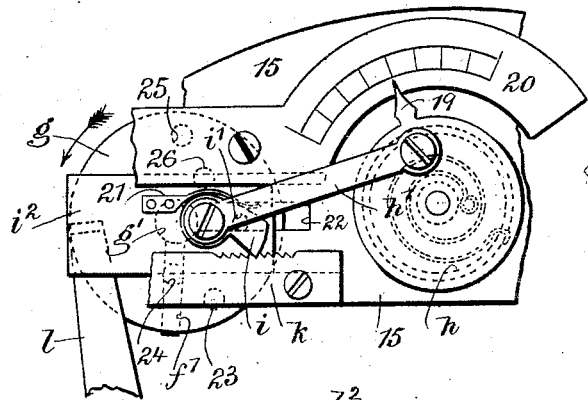
Fig. 10.
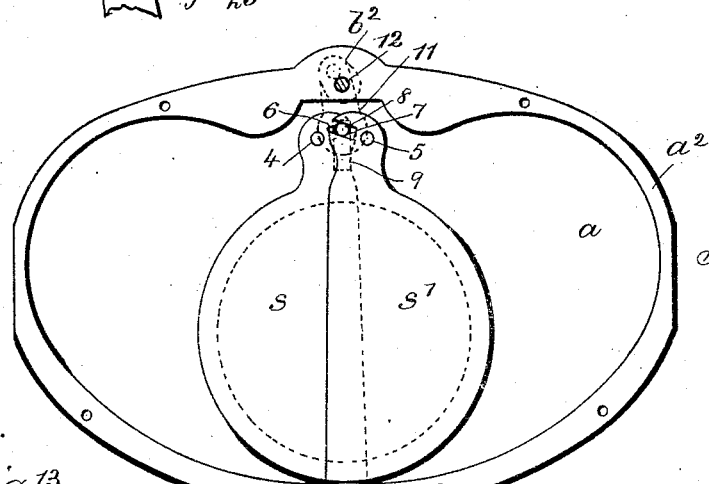
Fig. 11.
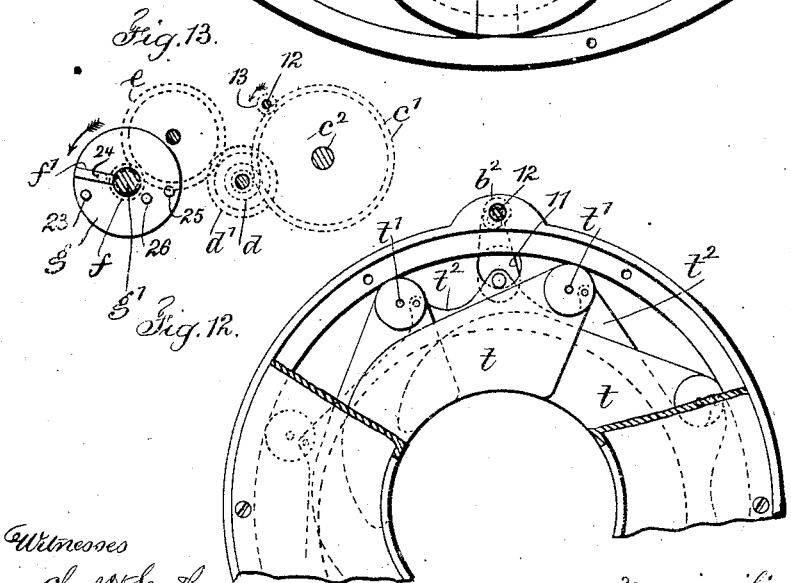
Fig. 13.
Fig. 12.
Witnesses
Cha⁹ H Smith
Inventor
Maximilian Klaiber.
for Harold Serrell
atty.

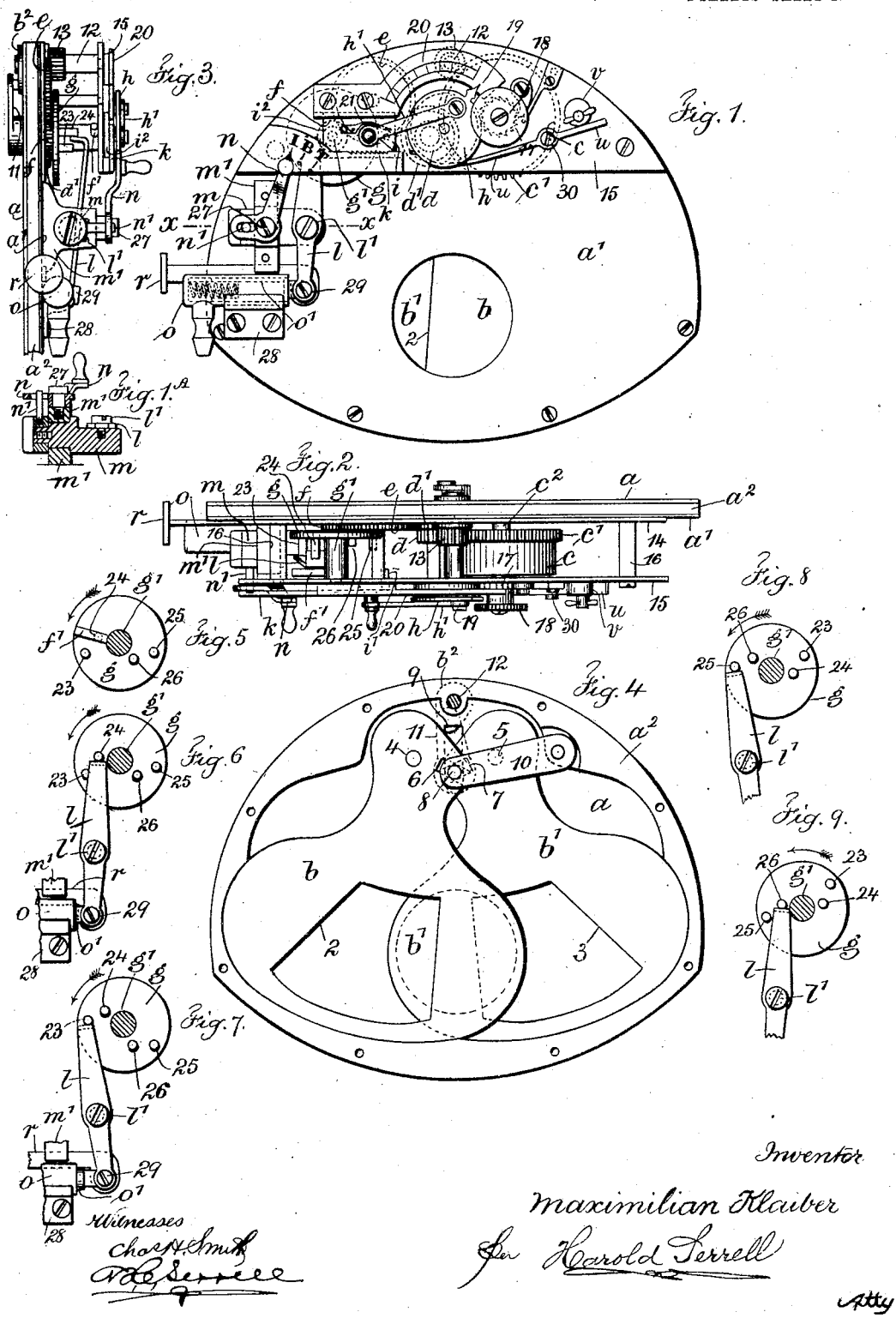

UNITED STATES PATENT OFFICE.

MAXIMILIAN KLAIBER, OF NEW YORK, N. Y., ASSIGNOR, BY MESNE ASSIGNMENTS, TO PROSCH PHOTOGRAPHIC SHUTTER AND OPTICAL COMPANY, A CORPORATION OF NEW YORK.

PHOTOGRAPHIC SHUTTER.

No. 854,221.   Specification of Letters Patent.   Patented May 21, 1907.

Application filed January 11, 1906. Serial No. 295,530.

*To all whom it may concern:*

Be it known that I, MAXIMILIAN KLAIBER, a citizen of the United States, residing at the borough of Brooklyn, in the county of Kings, city and State of New York, have invented a new and useful Improvement in Photographic Shutters, of which the following is a specification.

With photographic shutters as heretofore constructed experiments have gone to prove that the indicated speeds are rarely if ever attained, and that two or more exposures at the same indicated speed are not alike in lapsed time because of conditions inherent in the mechanism of the shutter and often beyond the control of the manufacturer and especially beyond the control of the operator. Besides in these shutters as usually constructed, there is considerable jar and vibration, especially at high speeds which is detrimental not only to the construction of the shutter but especially to the construction and nice adjustment of the parts going to make up the lens.

The old well known type of photographic blade shutters is adapted to give a superior illumination but is open to the latter objections especially at high and relatively high speeds and to the further objection that its speeds were only indicated and not stated, hence it could only be guessed at unless put to experimental test.

My invention relates to an improved form of photographic shutter in which the objects sought are to give an exposure as near constant as possible at a given indicated speed and in which the indicated speed shall bear a very close relation to the actual lapsed time, and in which there is an absence of vibration and jar so common and detrimental to the structure of a lens, making it possible for the photographic shutter, which is a necessary adjunct of a good lens, to more perfectly fill its part and keep pace with the improvements made in the quality and possible speeds of modern high grade lenses.

In the device of my present invention and as a motor I employ a train of gears actuated by a spring which can be maintained at constant pressure if desired. The operating mechanism is adapted to the well known form of shutter blades or flies that is of the crossing or Prosch type, of the open and shut type or the iris diaphragm type and the said device contains no delicate or intricate parts to get out of order.

In my improved shutter the opening and closing of the blades is performed with the same spring and this spring acting through the train of gears controls the instantaneous, bulb and time action and sets in motion means providing for graduated instantaneous exposures of from say one-fifth second to one one-hundredth of a second; movement of the aforesaid mechanism not being completed until released by the complete movement of the latter mechanism and the shutter automatically sets after each exposure ready for the next exposure. It is therefore possible to make repeated exposures without resetting the shutter until the power of the actuating spring is exhausted, but a constant speed and maximum actuation may be maintained by keeping the spring at maximum tension, all of which is hereinafter more particularly described.

In the drawing Figure 1 is an elevation representing the features of my present improvement mounted upon the case of the well known type of Prosch shutter. Fig. 1<sup>A</sup> is a section at the dotted line *xx* of Fig. 1 of the manually actuated setting mechanism of the shutter. Fig. 2 is a plan of the parts shown in Fig. 1. Fig. 3 is a side elevation of said parts, and Fig. 4 is an elevation of the shutter blades and part of the casing with the front plate removed. Figs. 5, 6, 7, 8 and 9 are elevations and partial sections showing similar parts to be known hereafter as the manually actuated setting mechanism, with the pin disk and time stop pins thereon in the various positions of said parts. Fig. 10 is an elevation of the devices providing for graduated instantaneous exposures the same being shown on an exaggerated scale over Fig. 1. Fig. 11 is an elevation of a shutter case of a general type with the front plate removed showing simple opening and closing blades adapted to be actuated by the same devices employed for actuating the blades shown in Fig. 4. Fig. 12 is a partial elevation and section of the old well known type of iris diaphragm shutter and the parts connected thereto by which this form of shutter is adapted to be operated by the devices of my present invention with equal facility to the form of shutter blades shown in Figs. 4 and 11, and Fig. 13 is a diagrammatic view illustrating a train of gears similar to the train shown in Fig. 1 and adapted for operating the shutter shown in Figs. 11 and 12; said train differing from the train of gears shown in Fig. 1 only in the proportion of one or more of the wheels.

The back plate $a$, front plate $a^1$ and intermediate frame $a^2$ Figs. 1 to 4 inclusive, is that of the well known Prosch type of photographic shutter, the casing being of approximately curvilinear triangular form.

$b\ b^1$ are the shutter blades received in this casing between these plates and provided with openings 2, 3, of trapezoidal form, said blades having pivots 4, 5, for pivotally mounting the same in said casing and slots 6, 7, at opposite points in adjacent edges and in proximity to the said pivots, there being a pin 8 in the slots, 6, 7, which pin also passes through the slots 9 of the said back and front plates $a$, $a^1$; this pin being guided in the slots of said plates and actuating said blades because of passing through the slots 6, 7, thereof.

I have shown in Fig. 4 an arm 10 within the casing of the shutter at one end connected to the shutter operating pin 8 and at the other end pivotally mounted in frame $a^2$ for the purpose of steadying the movement of the pin 8 in operating the blades.

A link 11 outside of the back plate $a$ of the shutter case is connected to the shutter operating pin 8 and a shaft 12 passes through the shutter case near the upper edge and on this shaft outside of the shuttter case is mounted a crank $b^2$ and to a pin on the free end of which the link 11 is connected. On this shaft 12 there is a pinion 13 which meshes with the toothed wheel $c^1$ of a spring barrel $c$; said spring barrel being on the shaft $c^2$ mounted in a frame of plates 14, 15, secured to the front plate of the shutter casing, posts 16 being employed for supporting the outer plate 15 and connecting the same to the inner plate 14, and I prefer to employ a pawl and ratchet 17 and a winding disk 18; the said disk and ratchet being upon the shaft $c^2$ and the pawl upon the plate 15 for the purpose of applying tension to the spring of the spring barrel for actuating the train of gears. Between this frame of plates on a suitable shaft is a pinion $d$ and toothed wheel $d^1$; the pinion $d$ meshing with the toothed wheel $c^1$ and the toothed wheel $d^1$ with the toothed wheel $e$ also on a shaft mounted between said frame of plates. The toothed wheel $e$ meshes with a pinion $f$ on a shaft $g^1$ also mounted on said frame of plates and on this shaft $g^1$ is a pin disk $g$, that is to say, a disk projecting from the surface of which are several pins placed in different positions and of different lengths and which are hereinafter more fully described.

The pinion $f$ is of the same diameter or size and with the same number of teeth as the pinion 13 and the parts of the train of gears are so proportioned that one-half revolution is imparted to the pinion 13 in the same period of time as one revolution to the pinion $f$.

$h$ is a spring barrel upon a hub or short shaft secured to the plate 15 and the same is provided with a pointer 19, and 20 is a curved metal plate having upon its face a graduated scale the divisional marks of which represent fractions of a second for graduated instantaneous exposures divided say between one-fifth of a second and one one-hundredth of a second; the pointer 19 being adapted with a turn of the spring barrel to be set to any one of the graduations of said scale.

A link $h^1$ is at one end pivotally connected to this spring barrel $h$ and at its other end to a pawl $i$. On the back of the pawl $i$ is a pawl pin $i^1$ adapted to move along through a slot 22 formed in the plate 15. This pawl $i$ is pivotally mounted on a reciprocating guide plate $i^2$ adapted to move between the plate 15 and the plate 20 and a rack plate $k$ secured to the plate 15, a spring 21 being secured to the plate $i^2$ and bearing upon the pawl $i$ so as to keep the pawl in engagement with the teeth of the rack plate $k$. These parts are shown of exaggerated size in Fig. 10 and from this illustration and the foregoing description it will be apparent that when the spring barrel $h$ is turned to the left from its initial position in Fig. 1 to the position Fig. 10 the spring will be under tension and will be held under tension by the pawl $i$ engaging the teeth of the rack plate $k$, and this tension will be released so that the parts may return to their initial position as soon as the pawl is lifted from the teeth of the rack plate and this movement is effected by a sweep pin $f^1$ on the shaft $g^1$ of the pin disk $g$ which moves in the direction of the arrow Fig. 10, and when said pin $f^1$ strikes the pin $i^1$ the pawl is raised and the force of the spring barrel $h$ made effective to return the parts to their initial position as shown in Fig. 1, it will also be apparent because the movement that can be imparted to the pawl pin $i^1$ is limited by the width of the slot 22 that when the pin $f^1$ strikes the pin $i^1$ and raises the pawl its movement is arrested until the pin $i^1$ by the longitudinal movement imparted to the same and the pawl moves off of the end of the pin $f^1$ as the parts with the turning of the spring barrel $h$ return to their initial position.

The pin disk $g$ heretofore referred to is provided as shown directly in Figs. 5 to 9 inclusive, with a stop pin 23, an instantaneous pin 24, a bulb pin 25 and a time pin 26, that is to say, these names for these pins represent the movements of the shutter effected by means of the pins.

I provide a lever $l$ with a hook at its upper free end and the same is pivotally mounted by a screw pivot $l^1$ to a rocker pin $m$ secured in a bearing $m^1$ on the plate $a^1$ of the shutter case. Mounted upon this bearing $m^1$ is a bell crank pointer lever $n$ with a finger knob near the pointer end employed for controlling the speed of the shutter and upon the prolongation of the rack plate $k$, Fig. 1, will be noticed the capital letters I B and T for instantaneous, bulb and time movements with one of which the pointer of the said lever is adapted to be brought into opposition. The short arm of this lever $n$ is slotted and receives a pin $n^1$ secured in the rocker pin $m$; said lever $n$ being pivoted at 27 to the bearing $m^1$. The swinging movement of the lever $n$ moves the pin $n^1$ and turns the rocker pin $m$ and swings the lever $l$. From this construction it will be apparent that a swinging movement manually imparted to this lever $n$ upon its pivot 27 through the interposition of the pin $m$ imparts a turning movement to the rocker pin $m$ in its bearing and consequently a swinging movement to the hook ended lever $l$ mounted upon this rocker pin $m$.

A bracket 28 is secured to the front plate of the shutter and it supports the case $o$ of the pneumatic release in which is a piston $o^1$, and there is in the case of the pneumatic release a contractile return spring the left hand end of which is fastened to the case, and the right hand end to the piston.

I have shown and prefer to employ a push rod $r$ occupying a position substantially parallel with the case $o$ of the pneumatic release, and the lower end of the lever $l$ is loosely connected by a pivot pin 29 to the adjacent ends both of the piston $o^1$ and of the push rod $r$ so that this lever $l$ may be moved at the pleasure of the operator either with a rubber tube and bulb to the pneumatic release or with a finger on the push rod $r$. This movement is a swinging one on the pivot $l^1$, and from the foregoing description it will be apparent that this lever $l$ has not only this swinging motion but a rocking motion with the pin $m$ calculated to bring the hook end of the lever $l$ nearer to or farther from the surface of the disk $g$ and this proximity together with this swinging movement produced by the movement of the bell crank pointer lever $n$ serves to bring the hook end of the lever $l$ not only into line with but into proximity with one or more of the pins 23, 24, 25 and 26 at the pleasure of the operator.

In the operation of the shutter, tension is applied by the pawl and ratchet device 17 and winding disk 18 to the spring barrel $c$ and a rotary movement is imparted by the unwinding of the spring barrel to the train of gears, that is, to the pinion 13, pinion $d$, toothed wheel $d^1$, toothed wheel $e$, pinion $f$ and disk $g$ so as to rotate the disk $g$ with the pins thereon and also turn the pin $f^1$ and impart to the pinion $f$ a rotation for each half rotation of the pinion 13; power is thus communicated from the spring barrel through its toothed wheel $c^1$ to the pinion 13 and therefrom to the crank $b^2$, link 11, shutter operating pin 8 and therefrom to the blades $b$ $b^1$ of the shutter. In this connection the sole office performed by the arm 10 shown in Fig. 4 is to steady the parts of the shutter operating pin 8 in the slots of the shutter plates so as to prevent any wabbling or lost motion.

Referring now particularly to Figs. 5 to 9 inclusive, Fig. 5 is a section through the shaft $g^1$ above the sweep pin $f^1$ showing the pins 23 to 26 in place and the direction of movement by an arrow, and Figs. 6, 7, 8 and 9 are sections below said sweep pin.

Fig. 6 represents the parts in the same position as they are shown in Fig. 1, that is, with the hook end of the lever $l$ engaging the instantaneous pin 24 so as to arrest the movement of the train of gears and with the bell crank pointer lever $n$ set to instantaneous. With the parts in this position, a movement now imparted to the piston $o$ of the pneumatic release or manually to the push rod $r$, will swing the lever $l$ on its pivot $l^1$ and move the hook end of the lever away from the instantaneous pin 24 toward the left hand, releasing the pin 24 so that the train of gears will be immediately set in motion; the movement actuating the pinion 13, as hereinbefore described swinging the shutter blades; as the pin disk $g$ completes one rotation the stop pin 23 comes against the hook end of the lever as shown in Fig. 7, the train of gears is arrested and the movement of the shutter blades stopped, but this movement has been sufficient to also impart a complete half rotation to the gear 13 and its movement transmitted to the shutter operating pin 8 has completely moved said shutter blades as shown in Fig. 4, so that the openings therein have moved into opposition for a full open exposure with a quarter revolution of the pinion 13 and with the other quarter revolution they have again closed, as shown in Fig. 4.

From the position Fig. 7 it is essential that the lever $l$ return to its initial position before another movement of the shutter and exposure of a sensitive film or plate thereby. This is effected by the release of the rod $r$ or piston $o^1$; the spring in the case of the pneumatic release returning the lever $l$ to the position shown in Figs. 1 and 6 in which the hook end of the lever moves away from the stop pin 23 and again engages the instantaneous pin 24. This pin 23 only acts in connection with the pins 24 and 26 and with reference to the pin 25 the pin 24 becomes the stop pin because in every instance the initial position of the parts is shown in Fig. 6 with the pin 24 against the hook end of the lever $l$, and it is to be understood that Fig. 6 represents the initial position for each movement of the shutter. In the operation of the shutter, if we now move the lever $n$ so that its pointer is in opposition to the letter B for a bulb exposure it will be apparent that the turning movement thus produced upon the pin $m$ and also upon the lever $l$ has brought the hook end of this lever nearer to the surface of the pin disk $g$.

The special office performed by the stop pin 23 is in connection with the instantaneous movement when the lever $l$ moves from the position of the parts Fig. 6 to the position Fig. 7 arresting the movement of the disk $g$ and train of gears and arresting the shutter blades, as it would be impossible to give the lever $l$ its movement away from the pin 24 and return to the path of said pin while the disk $g$ was making one revolution, therefore this movement is performed as herein described. The hook end of the lever $l$ is made of such width that as soon as it moves out of the circular path of either pin 24 or 26 it is in the path of either pin 23 or 25, or vice versa, to engage the same and arrest the movement of the disk $g$ in performing the functions of the shutter. It may here be remarked that the pin 24 is longer than the pins 23, 25 and 26 and that the length of said pins decrease in this order so that the pin 26 is the shortest of the four. This bulb movement or open and shut action of the shutter is produced by the operation of the push rod $r$ or the pneumatic release swinging the lever $l$ from the position Figs. 1 and 6 to the left and as the hook end of the lever is turned down toward the disk the same will arrest the movement of the train of gears and the shutter blades as the pin 25 strikes the end of the said lever $l$ in the position Fig. 8. In this position the apertures of the shutter blades coincide to produce an open position of the shutter for as reasonably long a period as pressure is maintained on the pneumatic release devices or rod $r$; the release of this lever $l$ now permits the spring in the case of the pneumatic release to draw the lever to the right, and as the pin 26 is the shortest of the four pins it will underrun the hook end of the lever $l$ so as to give another half rotation to the disk $g$ and bring the pin 24 against the hook end of the lever as shown in Fig. 6 and arrest this bulb movement.

To effect the time movement the pointed end of the lever $n$ is moved farther into opposition with the letter T; said movement turning the pin $m$ further and bringing the hook end of the lever nearer the disk $g$, and the operation of the lever $l$ as hereinbefore described from the position Fig. 6, again swings the said lever $l$ to the left, releasing the disk and train of gears which rotate actuating the shutter blades and permitting a half rotation of the disk $g$ into the position Fig. 8 where the pin 25 is arrested by the hook end of the lever $l$; the shutter being open and as the lever $l$ returns to its initial position and is moved away from the pin 25 it comes into the path of the pin 26 and the mechanism moves a slight distance between these two pins which is inappreciable at the shutter blades, so that their full open position is not disturbed. The shutter now remains open as long as may be desired and to close the same the lever $l$ must be a second time actuated, which moves it off to the left of the pin 26 Fig. 9, into the path of the stop pin 23 which arrests the movement of the train of gears as the shutter is closed, and from the position of this arrested movement which is shown in Fig. 7, to the initial position shown in Fig. 6 the lever $l$ is returned to contact with the pin 24.

From Figs. 5 to 9 inclusive, it will be noticed that the pins 23 and 24 as an operative pair and 25 and 26 as a second pair are substantially opposite to one another with reference to the center of the revoluble disk $g$. The movements therein described have been with special reference to the shutter blades shown in Fig. 4 which pass completely and return, that is, the blades are opened and shut each time the pin 8 moves upward and downward in the slot 9, but my invention is equally applicable to other forms of shutter blades such for instance as shown in Figs. 11 and 12, that is where it takes a complete movement both upward and downward of the pin 8 to make one exposure. In Fig. 11 the shutter blades $s$, $s^1$ as illustrated, overlap and the two shutters or flies as operated simply separate and return, but do not cross.

In Fig. 12 the shutter blades are of the well known iris diaphragm construction, it being possible to set these blades $t$ which are mounted upon pivots $t^1$ and actuated by a moving frame $t^2$ to the predetermined opening or aperture desired for the exposure to be given to a sensitive plate or film by opening the same to this extent and again closing it. To effect these movements and also to move the shutter blades shown in Fig. 11 the train of gears employed is the same, but the pinion 13 is reduced in diameter so that its circumference is only one half of the circumference of the pinion shown in Figs. 1 to 3 with reference to the crossing blades, because in these forms of shutter blades the blades are required to be given a complete outward and inward swinging movement for each exposure, consequently the pinion 13, Fig. 13, must be given one rotation for each rotation of the pin disk $g$.

The devices illustrated in Fig. 10 bear an exact relation to the instantaneous operations of the shutter as the speed of the shutter when the lever $n$ points to I is as great or greater than the maximum speed permitted by the operation of these devices and where such speed is to be modified and reduced from say one one hundredth of a second to one fifth of a second or more the devices shown in Fig. 10 come into play by arresting the movement of the instantaneous devices when the pin $f^1$ contacts with the pin $i^1$ and so remains until the pin $i^1$ by its longitudinal movement passes off the pin $f^1$ the shutter blades being open for this elapsed time which is determined and controlled by the setting of the pointer 19.

In connection with the devices shown in Fig. 10, I may by preference employ a means for controlling the turning movement of the spring barrel $h$ so as to increase the range of the exposures provided for by the shutter for times of one or two seconds as an illustration, and to effect this I have shown and may provide a spring $u$ pivoted at 30 to the plate 15 and at its free end curved and bearing upon the surface of the spring barrel $h$, and with this apparatus I may advantageously employ an eccentric $v$ pivoted to the plate 15 and adapted by its turning to bear with greater or lesser force on the short end of the spring arm $u$ so as to provide greater or lesser friction for retarding the movement of said spring barrel. In this connection the graduated scale upon the plate 20 will preferably be marked with two series of numbers— one above the scale and one below—the indications say from $\frac{1}{5}$ of a second to $\frac{1}{100}$ of a second and the other from several seconds to say $\frac{1}{4}$ of a second. In setting this mechanism shown in Fig. 10 the spring barrel is preferably turned manually by a finger pin on the pivot of the pawl $i$ as shown in Figs. 1 and 2.

I claim as my invention:

1. In a photographic shutter, the combination with a case and the shutter blades, of a spring actuated train of gears, a connection therefrom to the said blades, a manually actuated speed control, release mechanism and devices actuated by the latter mechanism and controlled by the speed control for regulating the movement imparted to the train of gears.

2. In a photographic shutter, the combination with a case and the shutter blades, of a spring actuated train of gears, a connection therefrom to the said blades, a manually actuated speed control, release mechanism, devices actuated by the latter mechanism and controlled by the speed control for regulating the movement imparted to the train of gears and spring actuated devices adapted to be set to predetermined graduated instantaneous exposures and released by the movement of the train of gear devices.

3. In a photographic shutter, the combination with a case and the pivoted shutter blades, of a spring actuated train of gears, a connection therefrom to the said blades, devices moving with said train of gears and means adapted to contact with said devices to arrest the movement of said gears at predetermined places according to the several exposures to be made.

4. In a photographic shutter, the combination with a case and the shutter blades, of a spring actuated train of gears, a connection therefrom to the said blades, devices moving with said train of gears, means adapted to contact therewith to arrest the movement of said gears at predetermined places according to the exposures to be made and spring actuated devices adapted to be set to predetermined graduated instantaneous exposures and released by the movement of the train of gear devices.

5. In a photographic shutter, the combination with a case, shutter blades and a spring actuated train of gears, of a revoluble disk actuated by the latter and pins in sets secured to and rising above the surface of said disk and of various lengths, a pivoted lever device adapted to contact with two or more of said pins in its movement and with the rotation of said disk according to the exposure to be made, means for swinging said lever on its pivot, a pivoted pointer lever adapted to be set for instantaneous, bulb and time exposures and a device actuated by the swinging of said indicating lever which in turn controls the position of the aforesaid pivoted lever and its contact relation with the pins of the disk.

6. In a photographic shutter, the combination with a case, shutter blades and a spring actuated train of gears, of a revoluble disk actuated by the latter and pins in sets secured to and rising above the surface of said disk and of various lengths, a pivoted lever device adapted to contact with two or more of said pins in its movement and with the rotation of said disk according to the exposure to be made, means for swinging said lever on its pivot, a pivoted pointer lever adapted to be set for instantaneous, bulb and time exposures, a bearing to which the pointer lever is pivoted, a rocker pin in said bearing, a connection between said latter lever and rocker pin, the aforesaid swinging lever being pivotally mounted on said rocker pin whereby with the movement of the said pointer lever and rocker pin the aforesaid swinging lever is swung to engage the same with predetermined pins of the said disk.

7. In a photographic shutter, the combination with a case, shutter blades and a spring actuated train of gears, of a revoluble disk actuated by the latter and pins in sets secured to and rising above the surface of said disk and of various lengths, a bearing on the shutter frame, a bell crank pointer or indicator lever $n$ pivotally connected thereto, its long arm adapted for manual operation to be brought into opposition with letters or marks indicating instantaneous, bulb or time exposures and its short arm slotted, a rocker pin $m$ passing through said bearing and having a pin $n^1$ therein passing through the slot of the lever $n$ whereby with the turning movement of the lever $n$ the pin $m$ is axially turned, a hook ended lever $l$ pivotally mounted on said rocker pin $m$ and at its hook end adapted to come in contact with predetermined pins of the aforesaid disk, a release mechanism for manual or pneumatic actuation and to which the opposite end of the lever $l$ is pivotally connected.

8. In a photographic shutter, the combination with a case, the shutter blades and a spring actuated train of gears, of a disk $g$, a shaft therefor and a pinion on said shaft meshing with the train of gears for its rotation, pins 23, 24, 25 and 26 secured to and arising above the surface of the said disk in pairs and in opposition and of different lengths, a pivoted lever having a hook on its free end and adapted in a normal position to rest against the pin 24, means for swinging said lever on its pivot to move the same away from said pin so that the disk may be rotated, the disk being again arrested by the return of said lever at its release.

9. In a photographic shutter, the combination with a case, the shutter blades and a spring actuated train of gears, of a disk $g$, a shaft therefor and a pinion on said shaft meshing with the train of gears for its rotation, pins 23, 24, 25 and 26 secured to and arising above the surface of the said disk in pairs and in opposition and of different lengths, a pivoted lever having a hook on its free end and adapted in a normal position to rest against the pin 24, means for swinging said lever on its pivot to move the same away from said pin so that the disk may be rotated, the disk being again arrested by the return of said lever at its release and means manually operated and adapted to be set for instantaneous, bulb and time exposures and which means change the relation of the hook end of the lever to said disk so that other of said pins may be contacted with according to the exposures to be made.

10. In a photographic shutter, the combination with a case, the shutter blades and a spring actuated train of gears, of a disk $g$, a shaft therefor and a pinion on said shaft meshing with the train of gears for its rotation pins 23, 24, 25 and 26 secured to and arising above the surface of the said disk in pairs and in opposition and of different lengths, a pin $f^1$ radially projecting from the shaft of said disk, spring actuated devices adapted to be set to predetermined graduated instantaneous exposures and a device connected therewith with which said pin $f^1$ comes in contact for effecting the release of the said devices with the movement of said disk.

11. In a photographic shutter, the combination with a case, the shutter blades and a spring actuated train of gears, of a disk $g$, a shaft therefor and a pinion on said shaft meshing with the train of gears for its rotation, pins 23, 24, 25 and 26 secured to and arising above the surface of the said disk in pairs and in opposition and of different lengths, a pin $f^1$ radially secured to the shaft of said disk and a spring barrel having a pointer, a rack, a pawl adapted to engage the rack and having a pin on the back thereof, a guide for said pawl and a link pivotally connecting said pawl and said spring barrel, said latter parts forming devices adapted to be set to predetermined graduated instantaneous exposures and released by the movement of the train of gears and said disk by the pin $f^1$ striking the pin of the pawl and lifting the same so as to bring in evidence the force of said spring barrel.

12. In a photographic shutter, the combination with a case, the shutter blades and a spring actuated train of gears, of a disk $g$, a shaft therefor and a pinion on said shaft meshing with the train of gears for its rotation, pins 23, 24, 25 and 26 secured to and arising above the surface of the said disk in pairs and in opposition and of different lengths, a pin $f^1$ radially secured to the shaft of said disk and a spring barrel having a pointer, a rack, a pawl adapted to engage the rack and having a pin on the back thereof, a guide for said pawl, a link pivotally connecting said pawl and said spring barrel, said latter parts forming devices adapted to be set to predetermined graduated instantaneous exposures and released by the movement of the train of gears and said disk by the pin $f^1$ striking the pin of the pawl and lifting the same so as to bring in evidence the force of said spring barrel and a variable spring tension device adapted to bear upon said barrel for retarding its movement.

13. In a photographic shutter, the combination with a case, the shutter blades and a spring actuated train of gears, of a disk $g$, a shaft therefor and a pinion on said shaft meshing with the train of gears for its rotation, pins 23, 24, 25 and 26 secured to and arising above the surface of the said disk in pairs and in opposition and of different lengths, a pin $f^1$ radially secured to the shaft of said disk and a spring barrel having a pointer, a rack, a pawl adapted to engage the rack and having a pin on the back thereof, a guide for said pawl, a link pivotally connecting said pawl and said spring barrel, said latter parts forming devices adapted to be set to predetermined graduated instantaneous exposures and released by the movement of the train of gears and said disk by the pin $f^1$ striking the pin of the pawl and lifting the same so as to bring in evidence the force of said spring barrel and a pivoted spring arm adapted to bear at one end on the periphery of the spring barrel and an eccentric device adapted to bear upon the other end of the pivoted spring arm for applying a regulatable friction to the spring barrel for retarding its movement.

14. In a photographic shutter, the combination with the shutter case and blades and a bearing $m^1$ thereon, of a lever $n$ pivotally mounted on said bearing and adapted to be brought to instantaneous, bulb and time indicating marks for such exposures, said lever having a slotted short end, a rocker pin in said bearing, a pin secured thereto and passing through the slot of said lever, a lever $l$ pivotally connected with the rocker pin $m$ so as to be turned with the movement of said pin as influenced by the swinging movement of the lever $n$ and said lever $l$ having a hook at one end, a pneumatic release device $o$ and push rod $r$ for manually actuating the same, a spring wthin the case thereof connected to the piston thereof, a pivot pin 29 connecting one end of the lever $l$ to both the piston of the pneumatic release and the push rod $r$ and means substantially as shown and described for actuating the blades of the shutter and the movements of which are controlled by the aforesaid devices for producing instantaneous, bulb and time exposures.

15. In a photographic shutter, the combination with the shutter case and blades and a bearing $m^1$ thereon, of a lever $n$ pivotally mounted on said bearing and adapted to be brought to instantaneous, bulb and time indicating marks for such exposures, said lever having a slotted short end, a rocker pin in said bearing, a pin secured thereto and passing through the slot of said lever, a lever $l$ pivotally connected with the rocker pin $m$ so as to be turned with the movement of said pin as influenced by the swinging movement of the lever $n$ and said lever $l$ having a hook at one end, a push rod $r$ for manual actuation, a pneumatic release device $o$, a spring within the case thereof connected to the piston thereof, a pivot pin 29 connecting one end of the lever $l$ to both the piston of the pneumatic release and to the push rod $r$, a spring actuated train of gears, a pinion meshing therewith and devices connecting the same to the shutter blades to effect their swinging movement and means interposed between the train of gears and the aforesaid swinging lever for effecting the various movements of the shutter blades.

16. In a photographic shutter, the combination with a case, the shutter blades and a pin 8 for swinging the same, of a shaft 12 in the case, a crank $b^2$ mounted thereon back of the case and a link pivotally connected to said crank at one end and at its other end to the pin 8, a pinion on the shaft 12, and a spring actuated train of gears with which said pinion is in mesh to effect its movement and that of the shutter blades.

17. In a photographic shutter, the combination with a case, the shutter blades and a spring actuated train of gears, of a pinion 13 meshing with said train of gears, a shaft on which said pinion is mounted and connections therefrom to the shutter blades for moving the same, a shaft $g^1$ and a pinion $f$ on said shaft bearing a direct and predetermined proportional relation to the said pinion 13 according to the character of the shutter blades to be actuated, manually actuated indicating mechanism adapted to be set to instantaneous, bulb and time exposures, a releasing mechanism and devices actuated by the latter mechanism and controlled by the aforesaid indicating mechanism and means interposed between the devices actuated by the release mechanism and the train of gears for controlling the movements thereof.

18. In a photographic shutter, the combination with a case, the shutter blades and a spring actuated train of gears, of a pinion 13 meshing with said train of gears, a shaft on which said pinion is mounted and connections therefrom to the shutter blades for moving the same, a shaft $g^1$ and a pinion $f$ on said shaft bearing a direct and predetermined proportional relation to the said pinion 13 according to the character of the shutter blades to be actuated, a disk $g$ on the shaft $g^1$, oppositely placed pins 23, 24, 25 and 26 in pairs, a release mechanism, a pivotally mounted indicating lever adapted to be set for instantaneous, bulb and time exposures, means actuated by the swinging of said lever, a swinging lever pivoted to said means connected at one end to the release mechanism and at the other end adapted to contact with said pins in a predetermined relation according to the character of the exposure.

19. In a photographic shutter, the combination with a case, shutter blades and a spring actuated train of gears, of a pinion meshing with the train of gears, a shaft for said pinion, a pin $f^1$ radially projecting from said shaft, spring actuated devices adapted to be set to predetermined graduated instantaneous exposures and a device connected therewith with which said pin $f^1$ comes in contact for effecting the release of said devices with the movement of said disk.

20. In a photographic shutter, the combination with a case, shutter blades and a spring actuated train of gears, of a pinion meshing with the train of gears, a shaft for said pinion, a pin $f^1$ radially projecting from said shaft, a spring barrel having a pointer, a rack, a pawl adapted to engage the rack having a pin on the back thereof, a guide for said pawl and a link pivotally connecting said pawl and said spring barrel, said latter parts forming devices adapted to be set to predetermined graduated instantaneous exposures and released by the movement of the train of gears and said disk by the pin $f^1$ striking the pin of the pawl and lifting the same so as to bring in evidence the force of said spring barrel.

21. In a photographic shutter, the combination with a case, shutter blades and a spring actuated train of gears, of a pinion meshing with the train of gears, a shaft for said pinion, a pin $f^1$ radially projecting from said shaft, a spring barrel having a pointer, a rack, a pawl adapted to engage the rack having a pin on the back thereof, a guide for said pawl and a link pivotally connecting said pawl and said spring barrel, said latter parts forming devices adapted to be set to predetermined graduated instantaneous exposures and released by the movement of the train of gears and said disk by the pin $f^1$ striking the pin of the pawl and lifting the same so as to bring in evidence the force of said spring barrel and a variable spring tension device adapted to bear upon said barrel for retarding its movement.

Signed by me this 4th day of January 1906.

M. KLAIBER.

Witnesses:
GEO. T. PINCKNEY,
E. ZACHARIASEN.